United States Patent
Li et al.

(10) Patent No.: US 9,262,833 B2
(45) Date of Patent: Feb. 16, 2016

(54) METHODOLOGY FOR PERFORMING DEPTH ESTIMATION WITH DEFOCUSED IMAGES UNDER EXTREME LIGHTING CONDITIONS

(75) Inventors: Pingshan Li, Sunnyvale, CA (US); Kensuke Miyagi, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 902 days.

(21) Appl. No.: 13/416,049

(22) Filed: Mar. 9, 2012

(65) Prior Publication Data

US 2013/0141537 A1    Jun. 6, 2013

Related U.S. Application Data

(60) Provisional application No. 61/565,790, filed on Dec. 1, 2011.

(51) Int. Cl.
*G06T 7/00* (2006.01)
*H04N 5/232* (2006.01)

(52) U.S. Cl.
CPC .......... *G06T 7/0069* (2013.01); *H04N 5/23212* (2013.01); *G06T 2207/10004* (2013.01); *G06T 2207/10148* (2013.01)

(58) Field of Classification Search
CPC ........................ G06T 7/0069; H04N 5/23212
USPC ......................................................... 348/46
See application file for complete search history.

(56) References Cited

U.S. PATENT DOCUMENTS

| | | | |
|---|---|---|---|
| 6,919,924 B1 | 7/2005 | Terashita | |
| 7,283,604 B2 | 10/2007 | De Man et al. | |
| 8,446,503 B1 * | 5/2013 | Koenck et al. | 348/297 |
| 8,542,313 B2 * | 9/2013 | Rapaport et al. | 348/345 |
| 2003/0164884 A1 * | 9/2003 | Morris et al. | 348/222.1 |
| 2004/0070565 A1 * | 4/2004 | Nayar et al. | 345/156 |
| 2007/0019883 A1 * | 1/2007 | Wong | G06T 7/0069 382/276 |
| 2007/0036427 A1 * | 2/2007 | Nakamura | G02B 27/0075 382/154 |
| 2007/0262985 A1 * | 11/2007 | Watanabe et al. | 345/420 |
| 2008/0158398 A1 * | 7/2008 | Yaffe et al. | 348/294 |
| 2010/0080482 A1 * | 4/2010 | Wong | H04N 5/23212 382/255 |
| 2010/0254585 A1 | 10/2010 | Brunner et al. | |

* cited by examiner

*Primary Examiner* — Sath V Perungavoor
*Assistant Examiner* — Jeffery Williams
(74) *Attorney, Agent, or Firm* — Haverstock & Owens, LLP (57) ABSTRACT

A methodology for performing a depth estimation procedure with defocused images under extreme lighting conditions includes a camera device with a sensor for capturing blur images of a photographic target under extreme lighting conditions. The extreme lighting conditions may include overexposed conditions and/or under-exposed conditions. The camera device also includes a depth generator that performs the depth estimation procedure by utilizing the captured blur images. The depth estimation procedure includes a clipped-pixel substitution procedure to compensate for the extreme lighting conditions.

12 Claims, 10 Drawing Sheets

METHODOLOGY FOR PERFORMING DEPTH ESTIMATION WITH DEFOCUSED IMAGES UNDER EXTREME LIGHTING CONDITIONS

CROSS-REFERENCE TO RELATED APPLICATIONS

This Application is related to, and claims priority in, U.S. Provisional Patent Application No. 61/565,790, entitled "Depth Estimation From Two Defocused Images Under Various Lighting Conditions," filed on Dec. 1, 2011. The foregoing related Application is commonly assigned, and is hereby incorporated by reference.

BACKGROUND SECTION

1. Field of the Invention

This invention relates generally to techniques for analyzing image data, and relates more particularly to a methodology for performing depth estimation with defocused images under extreme lighting conditions.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a methodology for performing depth estimation with defocused images under extreme lighting conditions is disclosed. In one embodiment, a camera device initially captures a defocused blur image F. The focus setting of the camera is then changed. For example, the focus setting may be adjusted to defocus the camera by one depth-of-field. The camera then captures a defocused blur image G that is more blurry (out of focus) than the previously captured blur image F.

A depth estimator of the camera next selects an appropriate kernel K for performing a convolution procedure. The kernel K may be configured in any appropriate manner. For example, in certain embodiments, kernel K may be configured as a three-by-three Gaussian matrix with a small variance. The depth estimator convolves the current blur image F with the selected kernel K to produce a convolved image F.

The depth estimator then determines whether blur image G has any clipped pixels that are either saturated or cutoff. If blur image G has clipped pixels, then the depth estimator performs a clipped-pixel substitution procedure by substituting any clipped pixel values from blur image G into corresponding pixel locations in the current convolved blur image F to thereby produce an enhanced current blur image F.

The depth estimator may then compare blur image G with the enhanced current blur image F. If blur image G and the current blur image F do not match, then the depth estimation procedure repeatedly returns to perform addition iterations until the two images match, so that the foregoing process may terminate. The present invention therefore provides an improved system and method for effectively and efficiently performing a depth estimation procedure under extreme lighting conditions.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for performing a depth estimation procedure with defocused images under extreme lighting conditions. In accordance with the present invention, a camera device includes a sensor for capturing blur images of a photographic target under extreme lighting conditions. The extreme lighting conditions may include over-exposed conditions and/or under-exposed conditions. The camera device also includes a depth generator that advantageously performs the depth estimation procedure by utilizing the captured blur images. In accordance with the present invention, the depth estimation procedure includes a clipped-pixel substitution procedure to compensate for the extreme lighting conditions.

Figure 1:
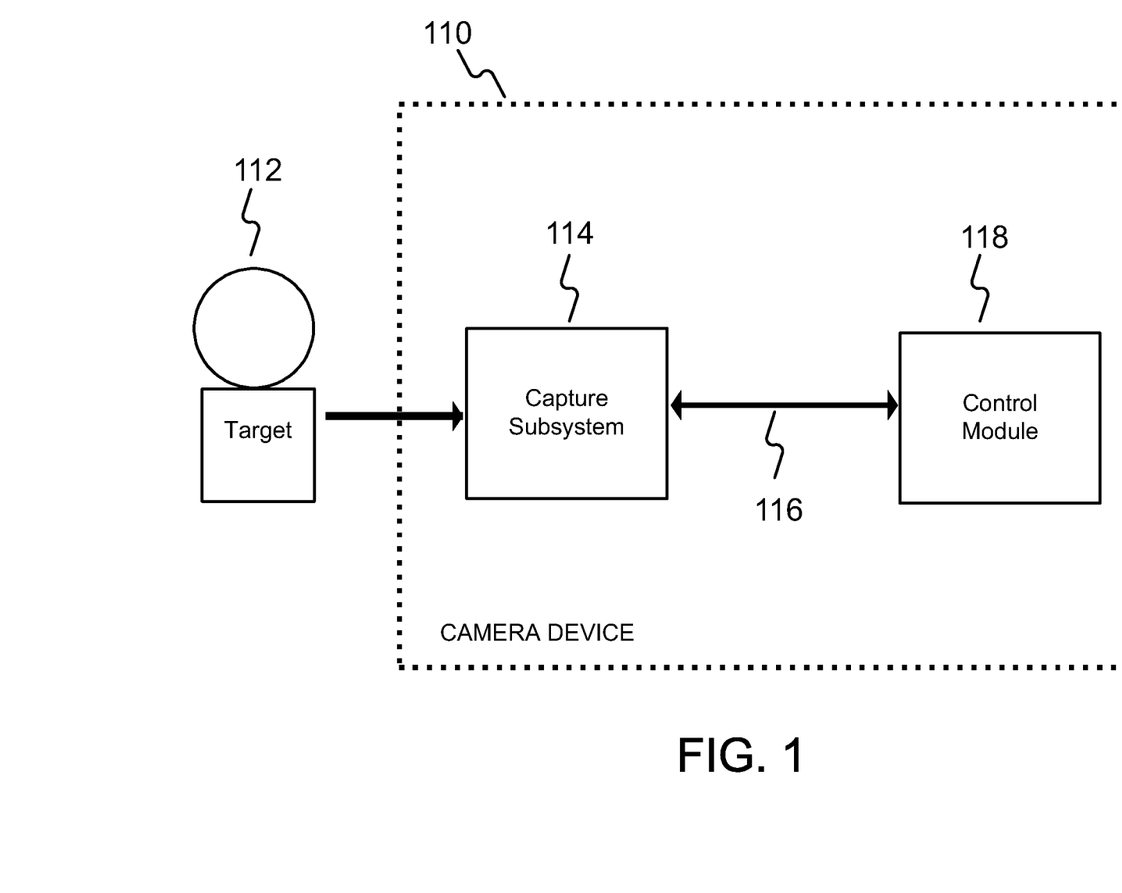
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
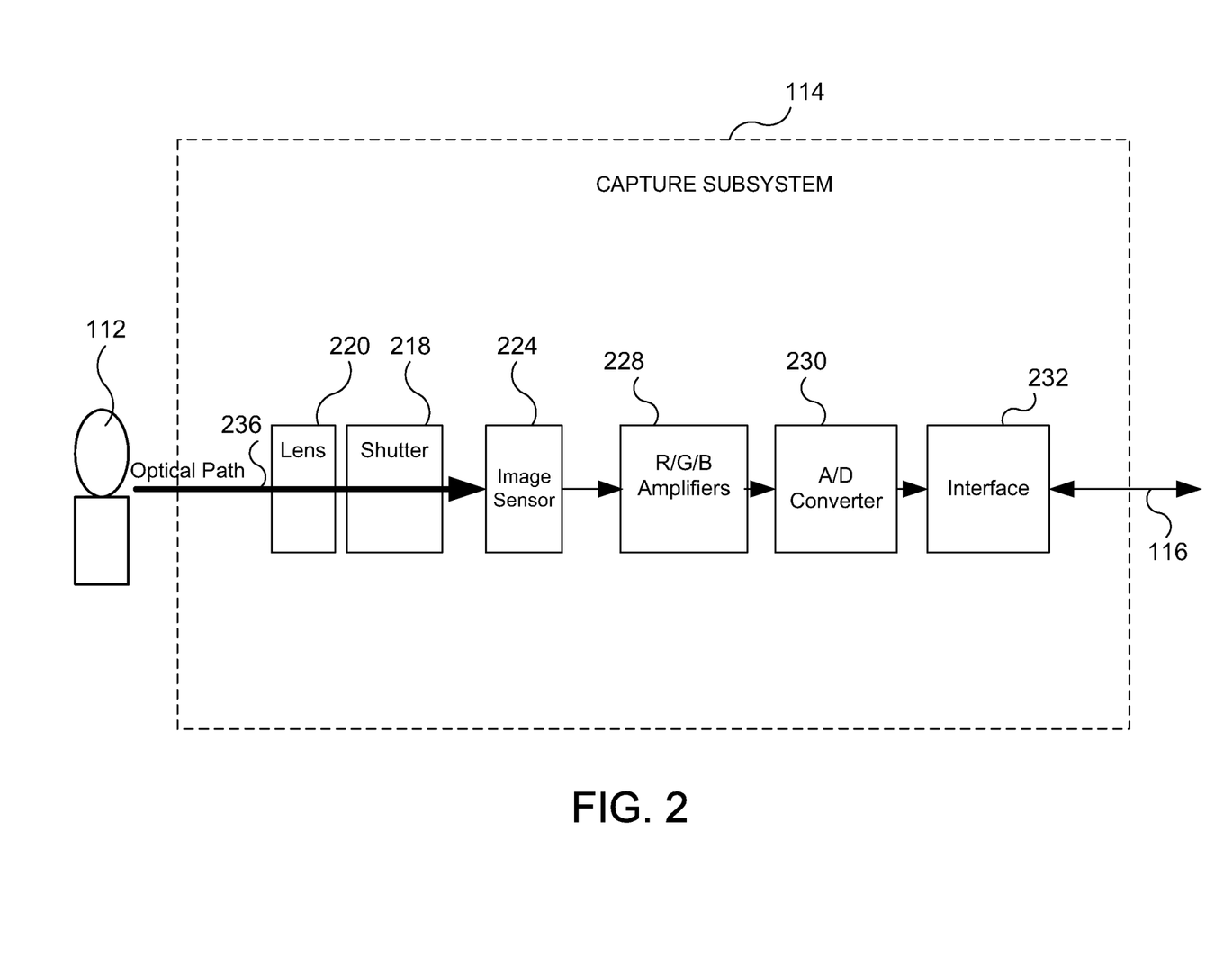
FIG. 2 is a block diagram for one embodiment of the capture subsystem of FIG. 1, in accordance with the present invention.

Referring now to FIG. 2, a block diagram for one embodiment of the

FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-9.

Figure 3:
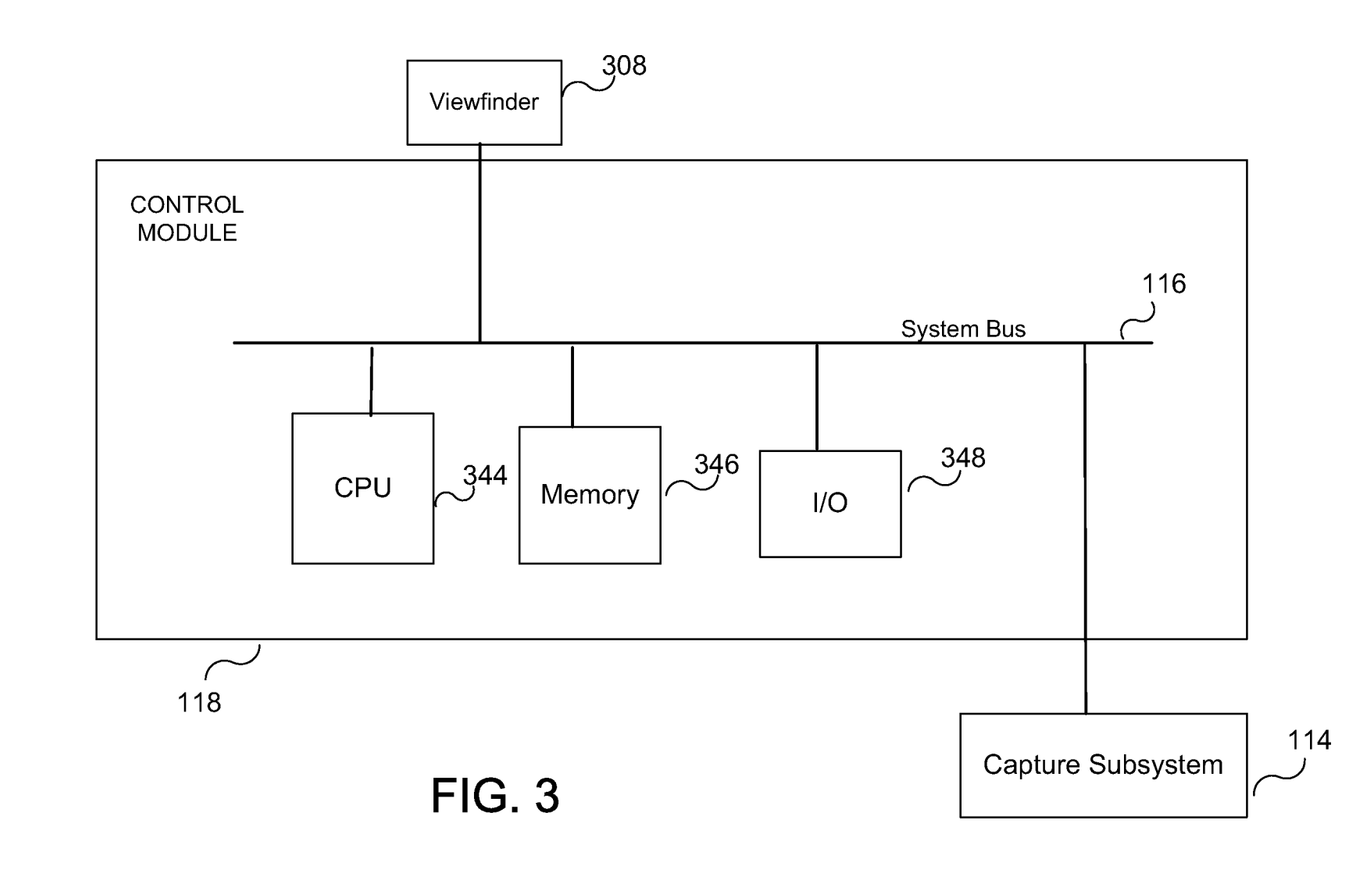
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 9.

Figure 4:
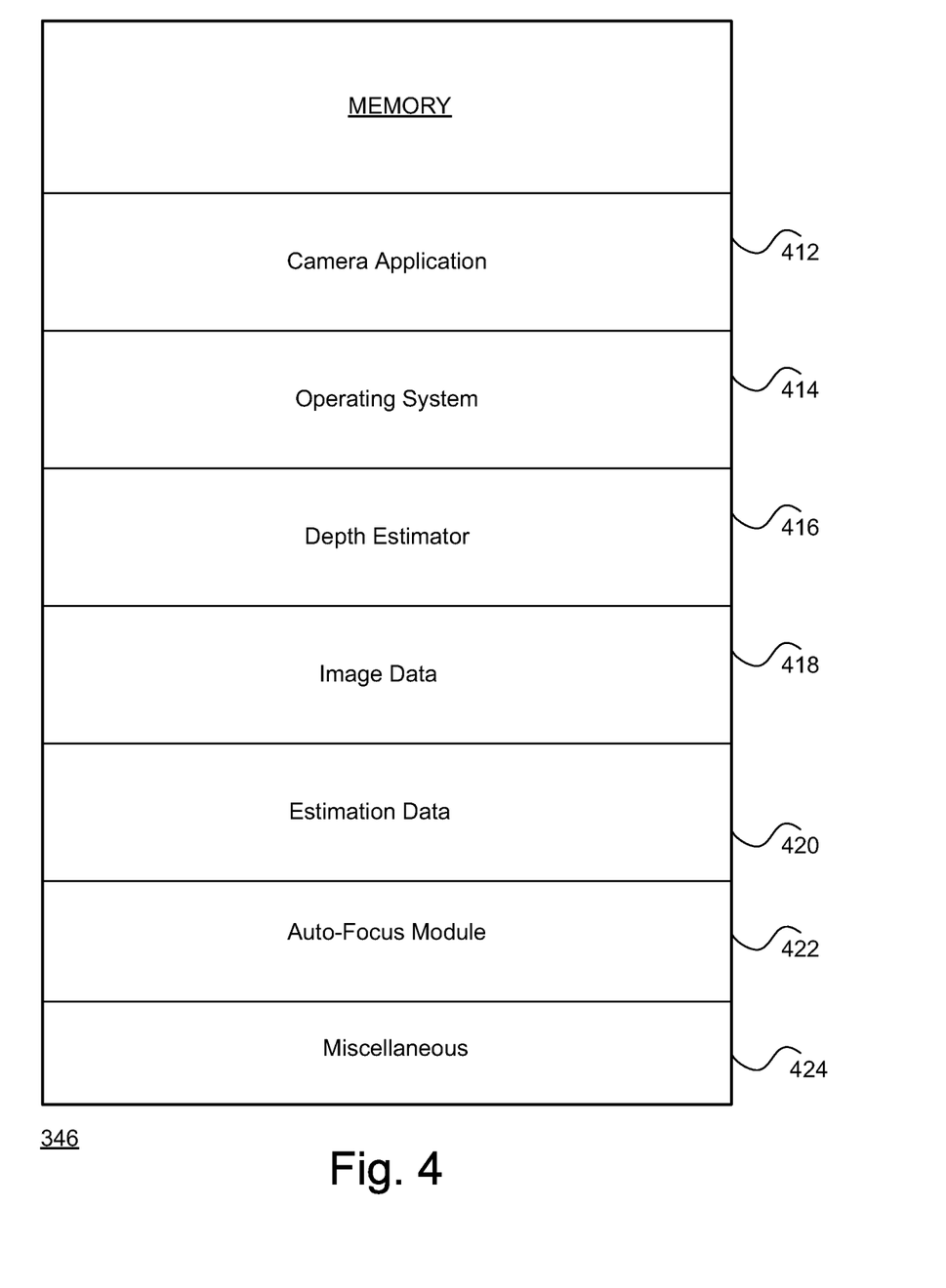
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and miscellaneous information 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. In the FIG. 4 embodiment, auto-focus module 422 may utilize the results of the depth estimation procedure to perform an auto-focus procedure for camera device 110. Miscellaneous information 424 includes any other appropriate information for the operation of camera 110. Additional details regarding the operation of depth estimator 416 are further discussed below in conjunction with FIGS. 5-9.

Figure 5:
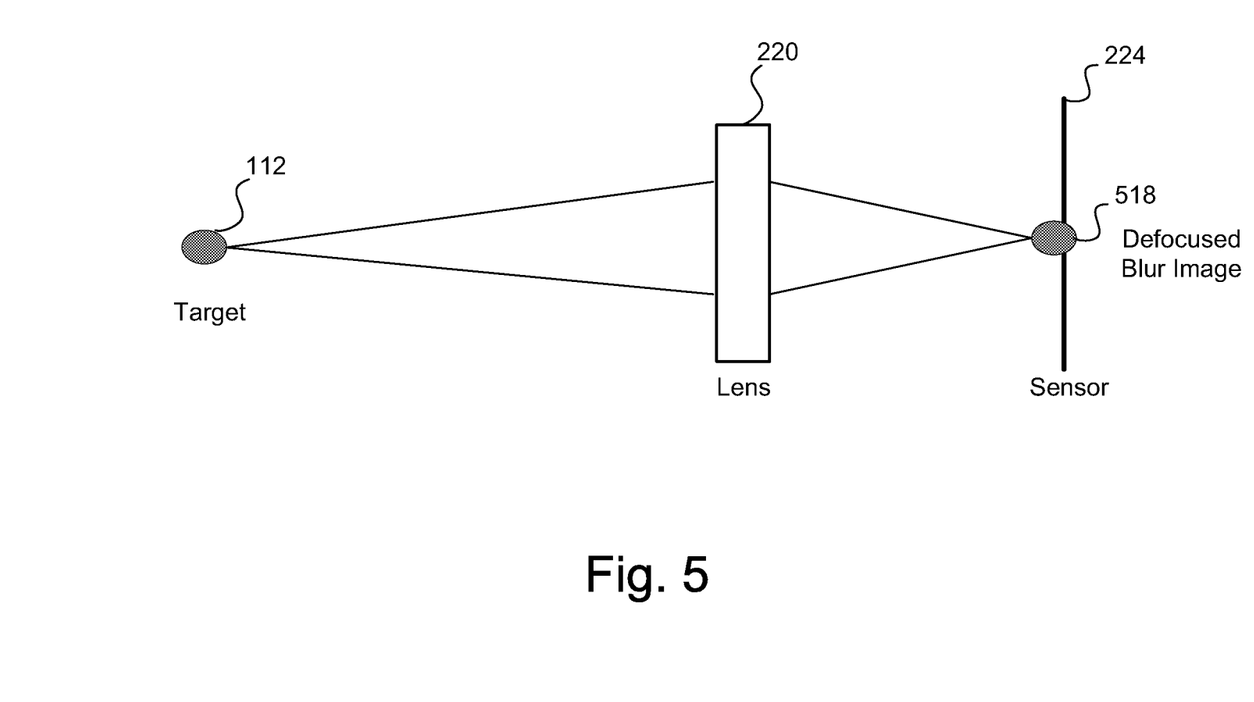
FIG. 5 is a diagram of one exemplary embodiment for capturing a defocused blur image, in accordance with the present invention.

Referring now to FIG. 5, a diagram of one exemplary embodiment for capturing a defocused blur image 518 is shown, in accordance with the present invention. The FIG. 5 embodiment is provided for purposes of illustration, and in alternate embodiments, the present invention may utilize various other configurations and elements to capture defocused blur images 518.

In the FIG. 5 embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are, for example, one depth-of-field away from each other. A slope of a known matching curve and the blur difference can be utilized to determine the depth of a given target 112. The generation and utilization of defocused blur images for depth estimation are further discussed below in conjunction with FIGS. 6-9.

Figure 6:
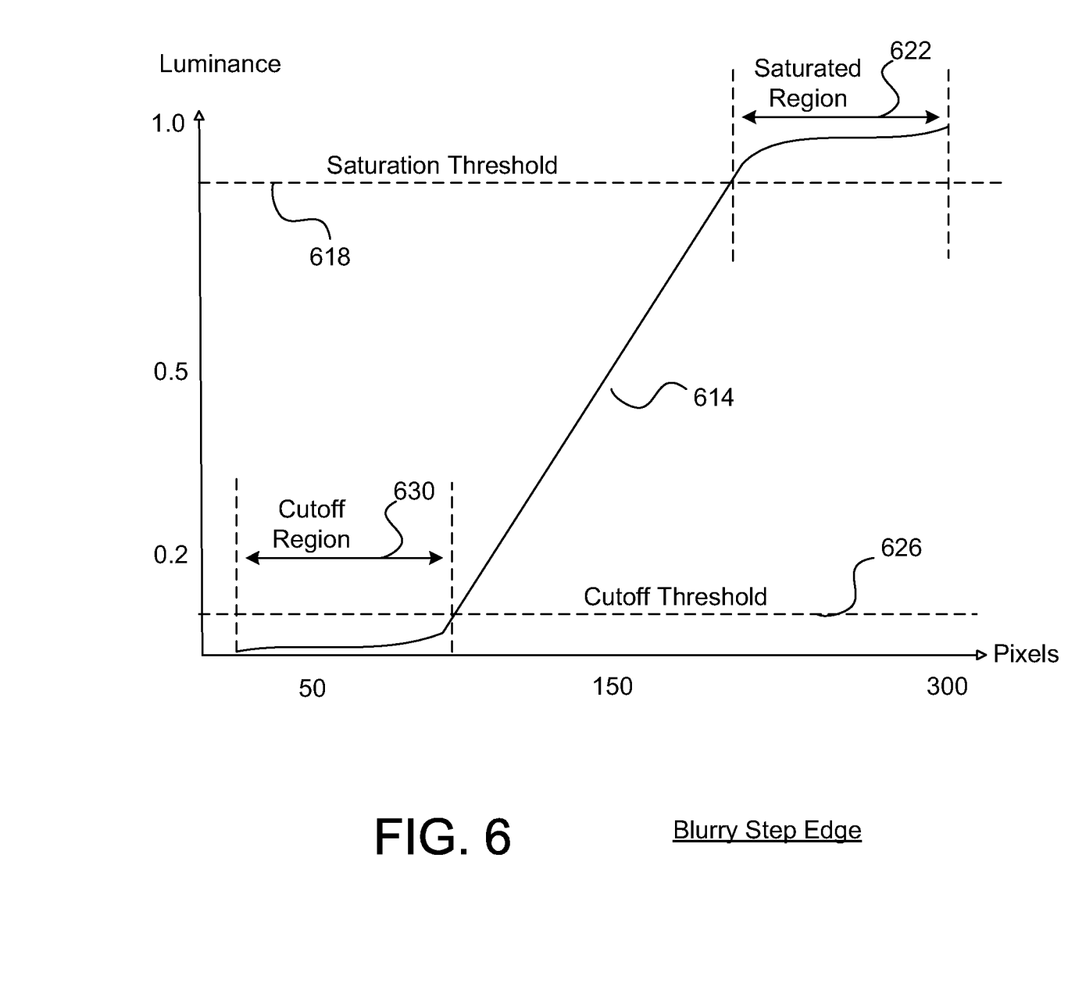
FIG. 6 is an exemplary graph of a blurry step edge, in accordance with one embodiment of the present invention.

Referring now to FIG. 6, an exemplary graph of a blurry step edge waveform 614 is shown, in accordance with one embodiment of the present invention. The FIG. 6 graph is presented for purposes of illustration, and in alternate embodiments of the present invention, the present invention may utilize graphs with configurations and parameters other than those discussed in conjunction with the FIG. 6 embodiment.

In the FIG. 6 graph, luminance values are represented on a vertical axis and numbered pixels are represented on a horizontal axis. In the FIG. 6 embodiment, waveform 614 may correspond to a defocused blur image 518 such as that discussed above in conjunction with FIG. 5. In the FIG. 6 embodiment, a saturation threshold 618 causes waveform 614 to be clipped in a saturated region 622. Similarly, a cutoff threshold 626 causes waveform 614 to be clipped in a cutoff region 630.

The foregoing clipping may be caused by extreme lighting conditions that exceed the dynamic range of the sensor 224 of camera 110. For example, overexposure may cause saturation and underexposure may cause cutoff. Clipping of either type may create difficulties in performing depth estimation procedures. In various different situations, either saturation, cutoff, or both conditions may be experienced with respect to a defocused blur image 518. Additional details for handling clipped image signals are further discussed below in conjunction with FIGS. 7-9.

Figure 7:
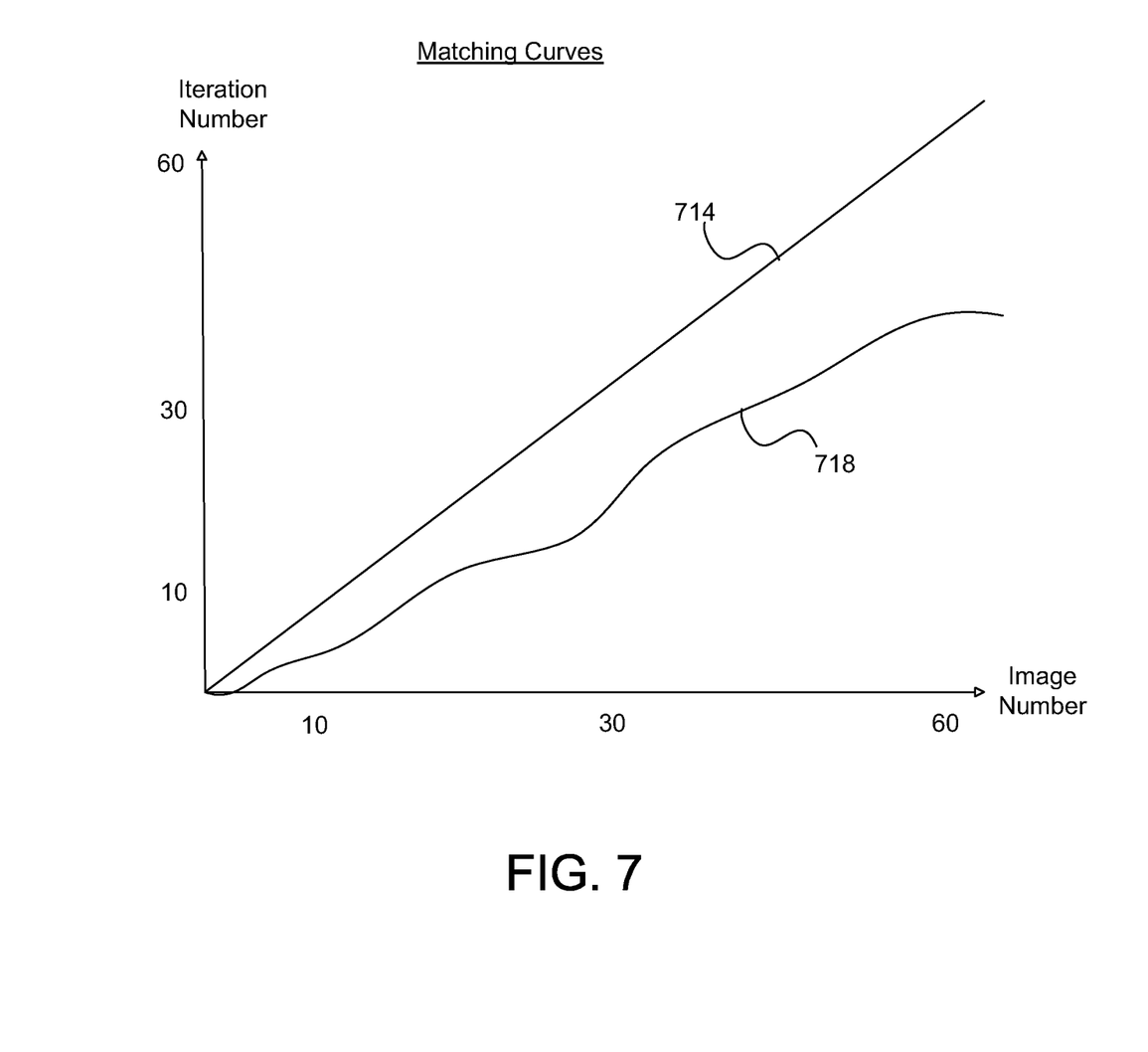
FIG. 7 is an graph of exemplary matching curves, in accordance with one embodiment of the present invention.

Referring now to FIG. 7, a graph of exemplary matching curves 714 and 718 is shown, in accordance with one embodiment of the present invention. The FIG. 7 embodiment is presented for purposes of illustration, and in alternate embodiments, the present invention may be implemented to utilize matching curves with configurations and parameters in addition to, or instead of, certain of those configurations and parameters discussed in conjunction with the FIG. 7 embodiment.

In certain embodiments, a blur image F and a more-defocused blur image G may be captured, the sharper image F is convolved with a Gaussian kernel (for example, a 3×3 Gaussian matrix with small variance) to produce a convolved image F. The convolved image F is compared to blur image G. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding the foregoing depth estimation technique are further discussed in U.S. Pat. No. 8,045, 046 to Li et al., which is hereby incorporated by reference.

In the FIG. 7 embodiment, iteration numbers are provided on a vertical axis, and image numbers are provided on a horizontal axis. The FIG. 7 graph is an example in which the target is in focus at picture number zero. The FIG. 7 graph includes an ideal matching curve 714 that would be produced using blur images 518 that are not subject to either the saturation or cutoff problems discussed above in conjunction with FIG. 6. Matching curve 714 would be effective in performing the standard depth estimation technique referred to above.

FIG. 7 also includes a distorted matching curve 718 that would be produced using blur images 518 that are subject to the saturation and/or cutoff problems discussed above in conjunction with FIG. 6. Because of the distorted waveform caused by clipping due to extreme lighting conditions, matching curve 718 is therefore not effective in performing the standard depth estimation technique referred to above. Further details for successfully performing depth estimation under extreme lighting conditions are described below in conjunction with FIGS. 8 and 9.

Figure 8:
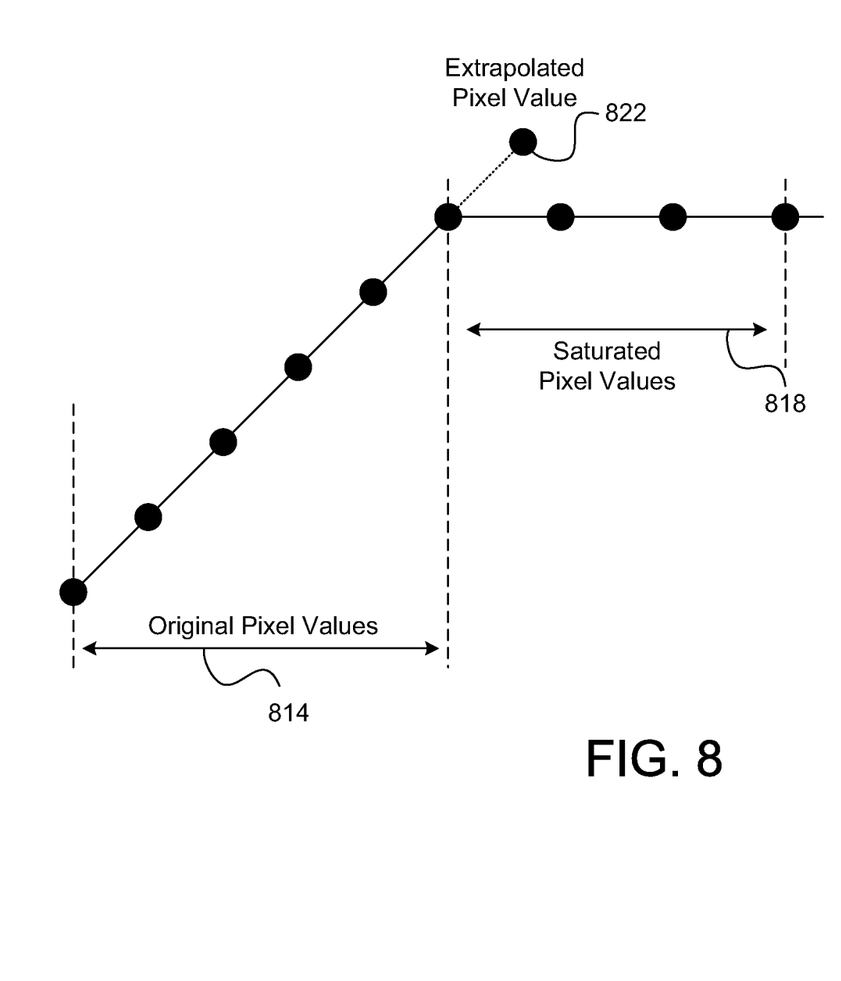
FIG. 8 is a diagram illustrating a pixel extrapolation procedure for blur matching, in accordance with one embodiment of the present invention.

Referring now to FIG. 8, a diagram illustrating a pixel extrapolation procedure for blur matching is shown, in accordance with one embodiment of the present invention. The FIG. 8 embodiment is presented for purposes of illustration, and in alternate embodiments, the present invention may perform pixel extrapolation procedure by utilizing techniques other than those discussed in conjunction with the FIG. 8 embodiment.

In the FIG. 8 embodiment, a set of original pixels values 814 and a set of saturated pixel values 818 are shown for a given defocused blur image. In addition, an extrapolated pixel value 822 is shown. To improve the matching performance, linear extrapolation may be utilized to restore one or more pixel values 822 that have been clipped. Before the extrapolated process, denoising may be performed in the clipped area to ensure that the pixel values in the clipped area are constant. This may be done by slightly lowering the saturation threshold and slightly increasing the cutoff threshold, just enough to remove the noise.

In certain embodiments, for a blurring filter with length of three, only one pixel 822 needs to be extrapolated near the clipping boundary before each convolution (see the note below). After convolution, the blurred signal may preferably be clipped again to prevent error propagation before matching error calculation. The foregoing one-dimensional blur matching technique may be extended to two-dimensional signals by applying linear extrapolation on the two different dimensions, respectively. Note: only one pixel needs to be extrapolated at each dimension when a 3×3 blur kernel is used for blur matching. If a larger blur kernel is used, then more pixels needs to be extrapolated.

Figure 9A:
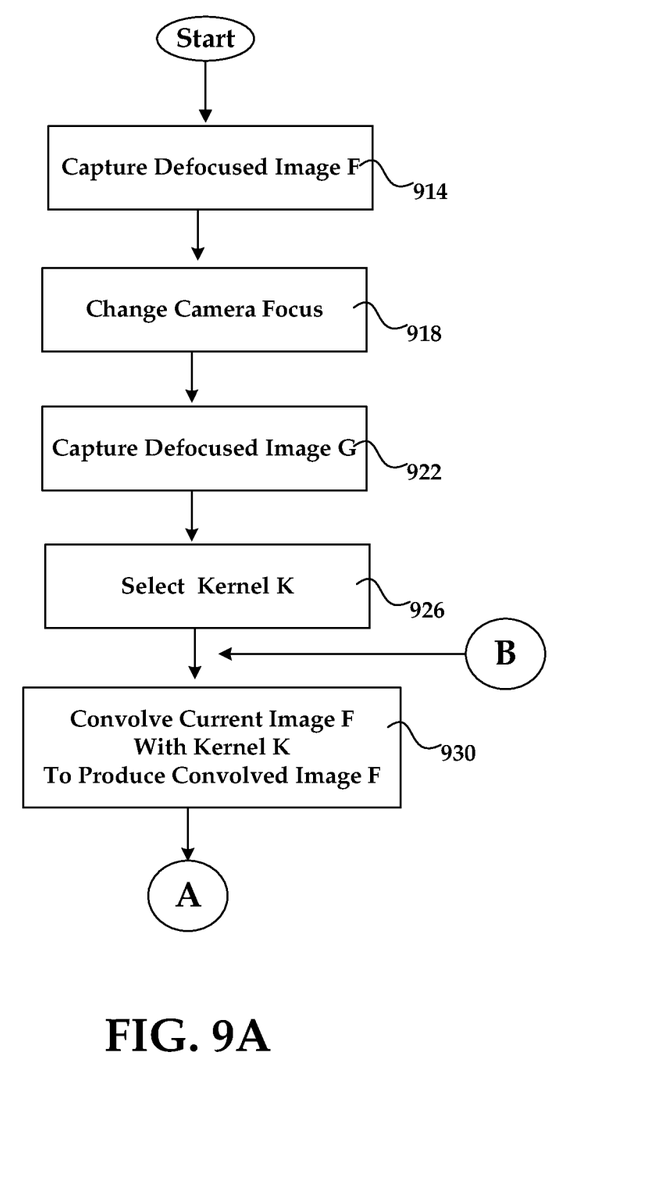
FIGS. 9A-9B are a flowchart of method steps for performing a depth estimation procedure under extreme lighting conditions, in accordance with one embodiment of the present invention.
Figure 9B:
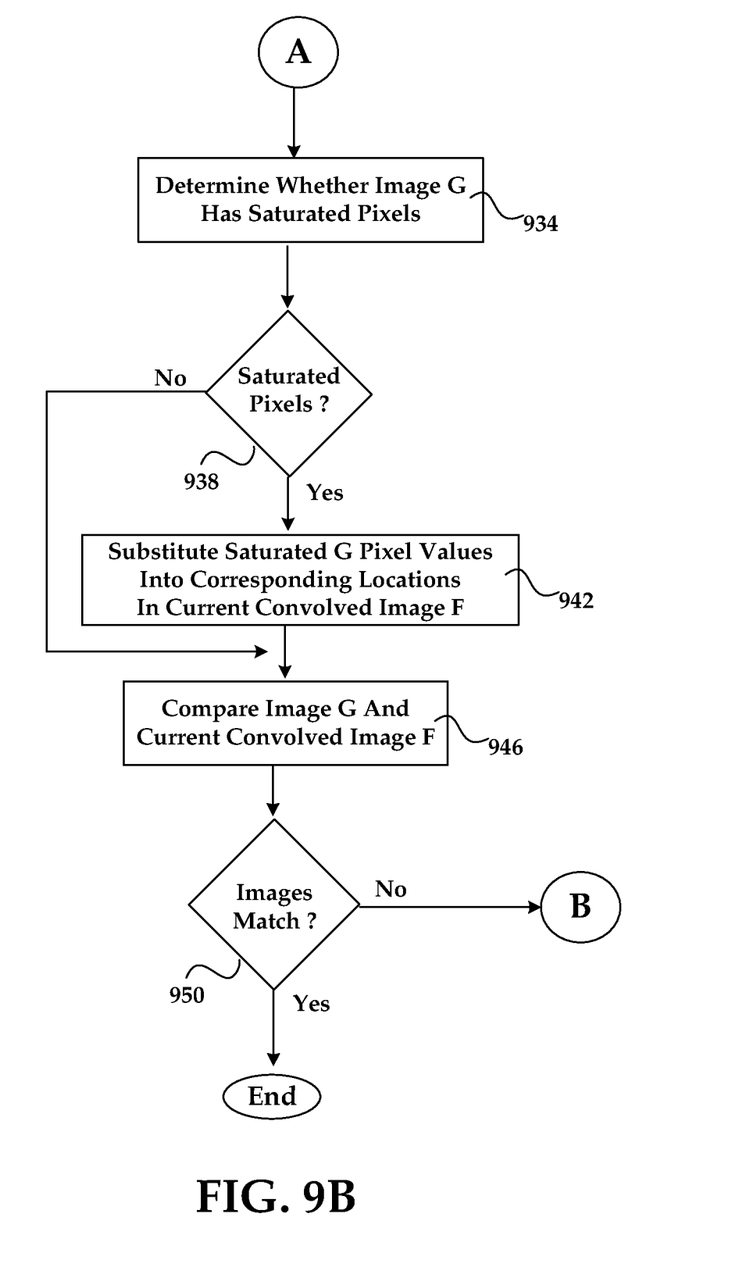

Referring now to FIG. 9, a flowchart of method steps for performing a depth estimation procedure under extreme lighting conditions is shown, in accordance with one embodiment of the present invention. The FIG. 9 embodiment is presented for purposes of illustration, and in alternate embodiments, the present invention may readily utilize various steps and sequences other than those steps and sequences discussed in conjunction with the FIG. 9 embodiment. For example, the FIG. 9 procedure illustrates handling overexposure lighting conditions. However, in certain embodiments, underexposure lighting conditions may be handled by utilizing a similar cutoff pixel-substitution technique.

In the FIG. 9A embodiment, in step 914, camera 110 captures a defocused blur image F. In step 918, the focus setting of camera 110 is changed. For example, in the FIG. 9A embodiment, the focus setting may be adjusted to decrease the focus of camera 110 by one depth-of-field. In step 922, camera 110 captures a defocused blur image G that is more blurry (out of focus) than previously captured blur image F. Again, the denoising procedure may be performed here in the clipped areas of the images F and G before blur matching.

In step 926, a depth estimator 416 or other appropriate entity selects an appropriate kernel K for performing a convolution procedure. The kernel K may be configured in any appropriate manner. For example, in certain embodiments, kernel K may be configured as a 3-by-3 Gaussian kernel with a small variance. In step 930, depth estimator 416 convolves the current blur image F with the selected kernel K to produce a convolved image F. The FIG. 9A process then advances to step 934 of FIG. 9B through connecting letter "A."

In steps 934 and 938, depth estimator 416 determines whether blur image G has any saturated pixels. If blur image G has saturated pixels that are clipped, then in step 942, depth estimator 416 performs a clipped-pixel substitution procedure by substituting any saturated (clipped) pixel values from blur image G into corresponding pixel locations in the current convolved image F. For example, if the waveform 614 of foregoing FIG. 6 represented blur image G, then the pixels from saturated region 622 of FIG. 6 could be utilized to populate corresponding pixels locations in the current convolved blur image F to thereby produce an enhanced current blur image F.

In step 946, depth estimator 416 may compare blur image G and the enhanced current blur image F. In step, 950, depth estimator 416 determines whether blur image G and current blur image F match. If the two images do not match, then the FIG. 9 process returns to step 930 of FIG. 9A through connecting letter "B" to perform another iteration. However, if the two images match in step 950, then the FIG. 9 process may terminate. The present invention therefore provides an improved system and method for effectively and efficiently performing a depth estimation procedure under extreme lighting conditions.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a depth estimation procedure, comprising:
   a sensor device for capturing blur images of a photographic target under extreme lighting conditions, said blur images being captured by utilizing different defocused lens positions; and
   a depth generator that performs said depth estimation procedure by utilizing said blur images, said depth estimation procedure including a clipped-pixel substitution procedure to compensate for said extreme lighting conditions, said sensor device and said depth generator being implemented in an electronic camera device, said sensor device capturing a blur image F corresponding to said photographic target by utilizing a first defocused lens position, said electronic camera device being adjusted to a second defocused lens position that is different than said first defocused lens position, wherein said sensor device captures a blur image G corresponding to said photographic target by utilizing said second defocused lens position, wherein said depth estimator selects a kernel K for performing a convolution procedure, wherein said depth estimator convolves said blur image F with said kernel K in a convolution procedure to produce a convolved blur image F, wherein said depth estimator determines whether said blur image G contains any clipped G pixels, wherein said depth estimator performs said clipped-pixel substitution procedure by substituting pixel values from said clipped G pixels into corresponding pixel locations in said convolved blur image F to produce an enhanced blur image F.

2. The system of claim 1 wherein one or more depth values from said depth estimation procedure are utilized to perform an automatic focusing procedure.

3. The system of claim 1 wherein said extreme lighting conditions include an overexposure condition resulting in saturated pixels.

4. The system of claim 1 wherein said extreme lighting conditions include an underexposure condition resulting in cutoff pixels.

5. A system for performing a depth estimation procedure, comprising:
   a sensor device for capturing blur images of a photographic target under extreme lighting conditions; and
   a depth generator that performs said depth estimation procedure by utilizing said blur images, said depth estimation procedure including a clipped-pixel substitution procedure to compensate for said extreme lighting conditions, said sensor device and said depth generator being implemented in an electronic camera device, said sensor device capturing a blur image F corresponding to said photographic target by utilizing a first defocused lens position, said electronic camera device being adjusted to a second defocused lens position that is different than said first defocused lens position, wherein said sensor device captures a blur image G corresponding to said photographic target by utilizing said second defocused lens position, wherein said second defocused lens position is less focused than said first defocused lens position, wherein said depth estimator selects a kernel K for performing a convolution procedure, wherein said depth estimator convolves said blur image F with said kernel K in a convolution procedure to produce a convolved blur image F, wherein said depth estimator determines whether said blur image G contains any clipped G pixels, wherein said depth estimator performs said clipped-pixel substitution procedure by substituting pixel values from said clipped G pixels into corresponding pixel locations in said convolved blur image F to produce an enhanced blur image F.

6. The system of claim 5 wherein said kernel K is implemented as a Gaussian 3-by-3 matrix with a small variance.

7. The system of claim 5 wherein said depth estimator compares said enhanced blur image F with said blur image G in a blur image matching procedure.

8. The system of claim 7 wherein said depth estimator performs additional iterations of said convolution procedure and said clipped-pixel substitution procedure until a matching result is reached, said depth estimator generating a total iteration number based upon said additional iterations.

9. The system of claim 8 wherein said depth estimator utilizes said total iteration number to generate a matching curve for said depth estimation procedure.

10. The system of claim 9 wherein said depth estimator utilizes said matching curve to generate a depth value corresponding to said photographic target.

11. A method for performing a depth estimation procedure by performing the steps of:
   utilizing a sensor device to capture blur images of a photographic target under extreme lighting conditions, said blur images being captured by utilizing different defocused lens positions; and performing said depth estimation procedure with a depth generator by utilizing said blur images, said depth estimation procedure including a clipped-pixel substitution procedure to compensate for said extreme lighting conditions, said sensor device and said depth generator being implemented in an electronic camera device, said sensor device capturing a blur image F corresponding to said photographic target by utilizing a first defocused lens position, said electronic camera device being adjusted to a second defocused lens position that is different than said first defocused lens position, wherein said sensor device captures a blur image G corresponding to said photographic target by utilizing said second defocused lens position, wherein said depth estimator selects a kernel K for performing a convolution procedure, wherein said depth estimator convolves said blur image F with said kernel K in a convolution procedure to produce a convolved blur image F, wherein said depth estimator determines whether said blur image G contains any clipped G pixels, wherein said depth estimator performs said clipped-pixel substitution procedure by substituting pixel values from said clipped G pixels into corresponding pixel locations in said convolved blur image F to produce an enhanced blur image F.

12. The system of claim 1 wherein each of the blur images have different focus levels.

* * * * *